(12) United States Patent
Sivertsen (10) Patent No.: US 8,964,710 B2
(45) Date of Patent: Feb. 24, 2015

(54) RELAYED CONTENT DISTRIBUTION AND DATA COLLECTION USING VEHICLES

(75) Inventor: Clas Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 125 days.

(21) Appl. No.: 13/189,004

(22) Filed: Jul. 22, 2011

(65) Prior Publication Data

US 2013/0022031 A1    Jan. 24, 2013

(51) Int. Cl.
| H04W 84/02 | (2009.01) |
| H04W 76/02 | (2009.01) |
| H04W 84/00 | (2009.01) |
| H04W 84/12 | (2009.01) |
| H04W 84/18 | (2009.01) |

(52) U.S. Cl.
CPC ............ *H04W 76/02* (2013.01); *H04W 84/005* (2013.01); *H04W 84/12* (2013.01); *H04W 84/18* (2013.01)
USPC .......................................... 370/338; 370/401

(58) Field of Classification Search
CPC ..................... H04N 21/2665; H04N 21/41407; H04N 21/4532; H04W 84/005
USPC .......................................................... 370/338
See application file for complete search history.

(56) References Cited

U.S. PATENT DOCUMENTS

| 2002/0049717 | A1 | 4/2002 | Routtenberg et al. |
| 2003/0216963 | A1 | 11/2003 | Ishiwaka et al. |
| 2004/0192351 | A1* | 9/2004 | Duncan ..................... 455/456.3 |
| 2008/0046464 | A1* | 2/2008 | Gustavsson ................ 707/104.1 |
| 2008/0066181 | A1 | 3/2008 | Haveson et al. |
| 2010/0082427 | A1* | 4/2010 | Burgener et al. .......... 705/14.49 |
| 2010/0088181 | A1 | 4/2010 | Crolley et al. |
| 2010/0115060 | A1* | 5/2010 | Julia et al. ..................... 709/219 |
| 2012/0158461 | A1* | 6/2012 | Aldrey et al. ................ 705/7.35 |
| 2012/0170560 | A1* | 7/2012 | Han et al. ..................... 370/338 |

OTHER PUBLICATIONS

International Search Report dated Dec. 24, 2013 in PCT/US12/47706 filed Jul. 20, 2012, first named inventor: Sivertsen.

* cited by examiner

*Primary Examiner* — Jeffrey M Rutkowski
*Assistant Examiner* — Romani Ohri
(74) *Attorney, Agent, or Firm* — Hope Baldauff, LLC (57) ABSTRACT

Technologies for relaying digital content and collecting data using vehicles, and an access point associated with a vehicle or structure are provided. A stationary AP is associated with a stationary vehicle structure. A content distribution portal receives a content package including metadata and content segments from a content provider via the Internet. The content distribution portal sends the content package to the stationary AP via the Internet. A mobile AP is mounted on or in a vehicle and is associated with a display device mounted on the vehicle. The stationary AP wirelessly sends the content package to the mobile AP using a P2P protocol when a wireless connection is established between the stationary and mobile APs. After receiving the entire content package, the mobile AP presents the content segments on the display device mounted on the vehicle in a manner specified by the metadata.

18 Claims, 6 Drawing Sheets

RELAYED CONTENT DISTRIBUTION AND DATA COLLECTION USING VEHICLES

TECHNICAL FIELD

The present disclosure pertains to a system and method for relayed content distribution and data collection using vehicles. More particularly, content is distributed to access points in the system using a peer-to-peer protocol, the Internet, and vehicles. Data is collected at some of the access points and relayed back in a similar manner.

BACKGROUND

Distribution of information to the public is increasingly occurring via digital communications using displays capable of displaying digital content. For example, rather than using light boxes, posters, and painted billboards to advertise a product, advertisements are now commonly presented using display configurations that are capable of showing digital content. As another example, instead of using mechanical flap displays to display transportation information at a train station, airport, etc., this information is now frequently disseminated through strategically placed liquid crystal display ("LCD") or plasma monitors, organic light emitting diode ("OLED") monitors, or displays using electronic paper (ePaper) of the kind utilized in some current e-book readers. Advertisements displayed on or within vehicles are also increasingly being presented using digital displays.

There are many reasons why information is increasingly being distributed using digital content. For example, prices for display configurations capable of showing digital content have dropped considerably over the years. Moreover, the cost, time delay, and inconvenience of distributing printed material have been steadily increasing. Furthermore, capturing and holding the attention of consumers now often requires the use of animated graphics, sound, and even three-dimensional (3D) content, and the most convenient and often the only way to achieve this is through digital content. As another example, the waste associated with the use of printed material runs counter to current trends in environmental protection that emphasize the limited use of paper products.

However, varying the digital content that is being presented on a digital display is a cumbersome and time-consuming task. For example, changing the digital content may involve bringing a mass storage device to the digital sign, plugging it in, and transferring the updated content. In addition, varying digital content may often only be performed at specific times, such as at night. To provide a specific example, when it is desired to change the digital content being displayed on an electronic billboard mounted in a bus, such as along the inside wall of the bus and above the windows and doors thereof, it would first be necessary to wait for a time when the bus reaches a service station and is expected to stay there long enough to perform the update, such as at the end of the day. Subsequently, a technician would need to connect a mass storage device to the electronic billboard, and then input commands into the electronic billboard to transfer the data. When a large amount of data is involved, this last step of data transfer may require waiting for a long period of time. As another example, when it is desired to change the advertising digital content displayed at various bus stops throughout a city, it would be necessary for a technician to travel to each bus stop and then perform the steps of data transfer.

While it could be possible to centralize such control and distribution of digital content, doing so using existing technologies, namely, dial-up access, digital subscriber line ("DSL") technology, a cable connection, wireless Internet connections involving wireless or cellular modems, etc., and general packet radio service ("GPRS"), Worldwide Interoperability for Microwave Access ("WiMAX"), and other mobile services and protocols, would involve paid subscription services in which the subscriber must sign up and pay fees for the connection and use of these services. Moreover, the potential large amount of data involved and the number of connected devices make using such existing technologies bandwidth and cost prohibitive.

Therefore, less expensive and more efficient methods for transferring data are needed. It is with respect to these and other considerations that the various embodiments described herein have been made.

SUMMARY

According to one embodiment described herein, a relayed content distribution and data collection system includes a stationary AP, a content distribution portal, and a mobile AP. The stationary AP is mounted on, in, or near a stationary vehicle structure and is connected to the Internet. The content distribution portal is connected to the Internet and receives a content package including metadata and content segments from a content provider via the Internet. The content distribution portal then sends the content package to the stationary AP via the Internet. The mobile AP is mounted on or in a vehicle and is associated with a display device mounted on the vehicle. The mobile AP establishes a wireless connection with the stationary AP using a wireless connectivity technology. The stationary AP sends the content package to the mobile AP using a P2P protocol when a wireless connection is established between the stationary AP and the mobile AP. The mobile AP then presents the content segments on the display device mounted on the vehicle in a manner specified by the metadata upon receiving the entire content package from the stationary AP.

According to one embodiment, the relayed content distribution and data collection system includes a plurality of mobile APs mounted respectively on or in a plurality of vehicles and associated respectively with display devices mounted on the vehicles. The stationary AP sends the content package selectively to one or more of the mobile APs as specified by the metadata and using the P2P protocol when a wireless connection is established between the stationary AP and any one of the mobile APs. Each of the mobile APs to which the content package is sent subsequently presents the content segments in the content package on the corresponding display device in a manner specified by the metadata after receiving the entire content package from the stationary AP.

In embodiments including a plurality of mobile APs, the mobile APs may establish wireless connections with each other. In such embodiments, when a wireless connection is established between a first mobile AP and a second mobile AP, any piece of the content package possessed by the first mobile AP but not the second mobile AP is sent to the second mobile AP using the P2P protocol upon a determination made with reference to the metadata that the content package is to be sent to the second mobile AP, and any piece of the content package possessed by the second mobile AP but not the first mobile AP is sent to the first mobile AP using the P2P protocol upon a determination made with reference to the metadata that the content package is to be sent to the first mobile AP.

According to another embodiment, the mobile AP obtains demographic information of persons riding in the vehicle and sends the demographic information to the stationary AP using the P2P protocol when a wireless connection is established between the mobile AP and the stationary AP. This demographic information is then sent to the content distribution portal by the stationary AP, and is ultimately sent to the content provider by the content distribution portal.

According to yet another embodiment, the relayed content distribution and data collection system further includes an offline AP mounted on, in, or near a stationary commuter structure. The offline AP establishes a wireless connection with the mobile AP using a wireless connectivity technology, and the mobile AP sends the content package to the offline AP using the P2P protocol when a wireless connection is established between the offline AP and the mobile AP. The offline AP may then present the content segments on a display device mounted on the stationary commuter structure in a manner specified by the metadata upon receiving the entire content package from the mobile AP.

The offline AP may obtain demographic information of persons at or in the vicinity of the stationary commuter structure and may send the demographic information to the mobile AP using the P2P protocol when a wireless connection is established between the offline AP and the mobile AP. The mobile AP then sends this demographic information to the stationary AP using the P2P protocol. The stationary AP subsequently sends the demographic information to the content distribution portal via the Internet, and the content distribution portal sends the demographic information to the content provider via the Internet.

According to a further embodiment described herein, a relayed content distribution and data collection method includes receiving a content package at a content distribution portal from a content provider via the Internet. The content package includes metadata and content segments. The content package is then sent via the Internet from the content distribution portal to a stationary AP. The stationary AP is mounted on, in, or near a stationary vehicle structure. The content package is finally sent to a mobile AP using a P2P protocol when a wireless connection is established between the stationary AP and the mobile AP using a wireless connectivity technology. The mobile AP is mounted on or in a vehicle and is associated with a display device mounted on the vehicle. The content segments are presented on the display device mounted on the vehicle in a manner specified by the metadata after the entire content package is received from the stationary AP by the mobile AP.

According to yet another embodiment described herein, an access point that is associated with a vehicle or structure and used in a relayed content distribution and data collection system includes a port unit, a wireless transceiver, a P2P unit, a data transmission controller, and a player. The port unit is able to establish a wired connection with another device. The wireless transceiver is able to establish a wireless connection with another device using a wireless connectivity technology. The P2P unit enables the sending and receiving of data using a P2P protocol. The data transmission controller performs at least one of the following: sends a content package to another access point using the P2P protocol and through the wireless transceiver with reference to metadata in the content package, receives the content package through the wireless transceiver using the P2P protocol, and receives the content package through the port unit and the Internet. The player presents content segments in the content package on the display device of the vehicle or structure in a manner specified by the metadata in the content package.

These and various features as well as advantages, which characterize the disclosure presented herein, will be apparent from a reading of the following detailed description and a review of the associated drawings.

DETAILED DESCRIPTION

The following detailed description is directed to a system and method for relayed content distribution and data collection using vehicles. In the following detailed description, references are made to the accompanying drawings that form a part hereof, and which are shown by way of illustration specific embodiments or examples. Referring now to the drawings, in which like numerals represent like elements through the several figures, aspects of the system and method provided herein will be described.

Figure 1:
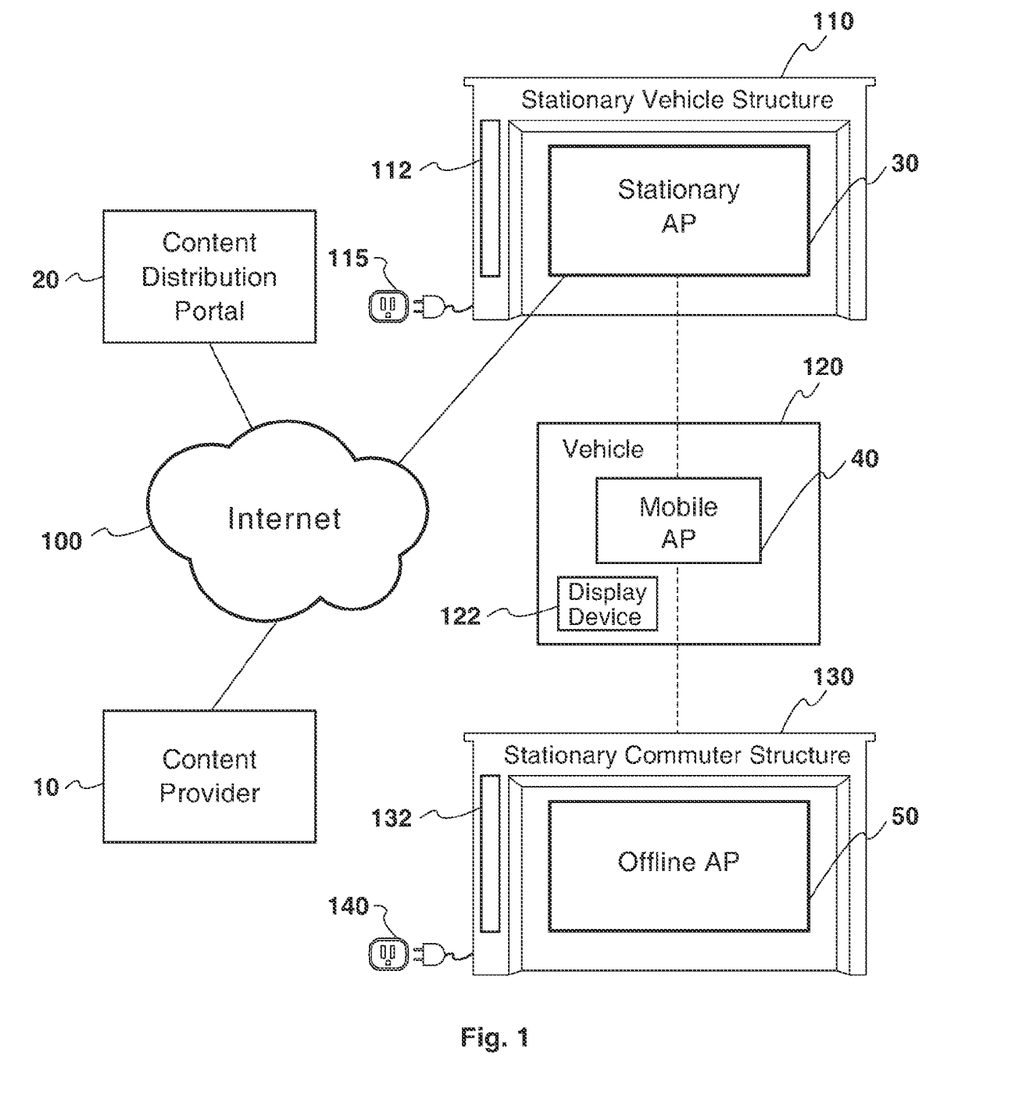
FIG. 1 is a block diagram of one embodiment illustrating a relayed content distribution and data collection system according to the disclosure herein.

Referring now to FIG. 1, a block diagram illustrates one embodiment of a relayed content distribution and data collection system. The relayed content distribution and data collection system comprises a content provider 10, a content distribution portal 20, a stationary access point (AP) 30, a mobile AP 40, and an offline AP 50.

The content provider 10 may be a company, such as an advertising company, or an individual user. The content provider 10 creates a content package including, for example, video clips, pictures, movies, 3D (three-dimensional) images, songs, etc., and additionally including metadata. The metadata corresponds to all of the individual content segments or there can be separate metadata corresponding to each of the individual content segments in the content package. The content provider 10 then sends the content package to the content distribution portal 20 via the Internet 100. The metadata may include information of how each of the video clips, pictures, movies, 3D images, songs, etc. are to be distributed, as well as how and when each of the video clips, pictures, movies, 3D images, songs, etc. are to be presented. It is noted that "present" is used herein to indicate the fact that the content segments may include video and/or audio. Additional details regarding the metadata are provided below.

The content distribution portal 20 is connected to the Internet 100 and is connected to the content provider 10 via the Internet 100. In some embodiments, the content distribution portal 20 establishes a web user interface and the content provider 10 creates and sends the content package using the web user interface. The content distribution portal 20 receives the content package created by the content provider 10 and sends the content package via the Internet 100 to the stationary AP 30. In embodiments including a plurality of stationary APs 30, the content distribution portal 20 sends the content package selectively to the stationary APs 30 using the metadata in the content package. For example, the content distribution portal 20 may send the content package to one or more stationary APs 30, but not to others, as specified by the metadata in the content package. The content distribution portal 20 also sends information to the content provider 10, as will be described below.

The stationary AP 30 is connected to the Internet 100, either directly or through a company server, and is connected to the content distribution portal 20 via the Internet 100. The stationary AP 30 receives the content package sent by the content distribution portal 20. The stationary AP 30 is disposed in, on, or near a stationary vehicle structure 110, such as a bus service station. The stationary vehicle structure 110 is connected to a power source 115, such as an AC (alternating current) power supply, to obtain power for the stationary AP 30 and for a display device 112 mounted on the stationary vehicle structure 110.

In some embodiments, the stationary AP 30 presents the content segments in the content package on the display device 112 with reference to the metadata in the content package. As an example, the metadata in the content package may specify which content segments are to be presented on the display device 112, the times of the day that the content segments are to be presented on the display device 112, how long (for example, how many days) the content segments are to be presented on the display device 112, if and how specific content segments are to be repeated, etc. The metadata similarly specifies such parameters for the content segments in the content package with respect to display devices associated with the mobile AP 40 and the offline AP 50.

The mobile AP 40 is mounted on or in a vehicle 120. The mobile AP 40 receives the content package wirelessly from the stationary AP 30. In embodiments including a plurality of mobile APs 40, the metadata in the content package may also specify which mobile APs 40 are to receive the content package and which mobile APs 40 are not to receive the content package, and the stationary AP 30 sends the content package selectively to the mobile APs with reference to the content package in the metadata. The mobile AP 40 is connected to the stationary AP 30 through a wireless connectivity technology such as Wi-Fi® to receive the content package from the stationary AP 30. Subsequently, the mobile AP 40 presents the content segments in the content package on a display device 122 mounted on the vehicle 120 in a manner specified by the metadata in the content package. The mobile AP 40 may be connected to the display device 122 through a wired connection, or a wireless connectivity technology, such as Bluetooth®.

In some embodiments, after a wireless connection is established between the mobile AP 40 and the stationary AP 30, the mobile AP 40 receives the content from the stationary AP 30 using a peer-to-peer (P2P) protocol. As known in the art, the use of a P2P protocol for file transfer purposes involves dividing the file being transferred into segments referred to as pieces.

As an example, the vehicle 120 in which the mobile AP 40 is installed may be a bus, and the stationary vehicle structure 110 with which the stationary AP 30 is associated may be a bus service station. In this example, when the vehicle 120 stops at the stationary vehicle structure 110, the mobile AP 40 installed in the vehicle 120 establishes a wireless connection with the stationary AP 30 at the stationary vehicle structure 110. The mobile AP 40 then obtains the content package from the stationary AP 30. Since the vehicle 120 may not stay at the stationary vehicle structure 110 for a period long enough to obtain all the content package, the mobile AP 40 may obtain only a piece(s) of the content package from the stationary AP 30 each time the vehicle 120 is stopped at the stationary vehicle structure 110 until the entire content package is obtained by the mobile AP 40.

Moreover, as known in the art, with the use of a P2P protocol for file transfer purposes, as each "peer" receives a new piece of the file, the peer becomes a source of that piece to other peers. Therefore, in some embodiments, when there are a plurality of vehicles 120 and a plurality of mobile APs 40 installed therein, whenever one of the mobile APs 40 receives a piece of the content package from the stationary AP 30, the mobile AP 40 becomes a source of that piece of the content package for the other mobile APs 40. So, for example, when two vehicles 120 are stopped at a red light, it would be possible for the mobile APs 40 associated with the vehicles 120 to establish a wireless connection and transfer pieces of the content package to each other. In another example, one of the vehicles 120 may be parked at the stationary vehicle structure 110, and in addition to receiving pieces of the content package from the stationary AP 30, the mobile AP 40 in the vehicle 120 may receive pieces of the content package from the mobile APs 40 in the other vehicles 120 also parked at the stationary vehicle structure 110. The mobile AP 40 receiving pieces of the content package from the stationary AP 30 and the mobile APs 40 in the other vehicles may also simultaneously become a source of the pieces it has received for any other mobile AP 40 at the stationary vehicle structure 110 lacking those pieces of the content package.

The offline AP 50 is mounted in, on, or near a stationary commuter structure 130, such as a bus stop or other public transportation structure, including but not limited to train depots, subways, airports, passenger trams, etc. The stationary commuter structure 130 is connected to a power source 140, such as an AC (alternating current) power supply, to obtain power for the offline AP 50 and for a display device 132 mounted on the stationary commuter structure 130. The offline AP 50 is not connected to the Internet 100. The offline AP 50 obtains the content package through the mobile AP 40 using a P2P protocol. In the example where the vehicle 120 is a bus and the stationary commuter structure 130 is a bus stop, each time the vehicle 120 stops at the stationary commuter structure 130, a wireless connection is established between the mobile AP 40 and the offline AP 50 through a wireless connectivity technology such as Wi-Fi®, after which the offline AP 50 receives the content package or a portion thereof from the mobile AP 40. The offline AP 50 may receive a piece(s) of the content package from the mobile AP 40 each time the vehicle 120 stops at the stationary commuter structure 130 to let passengers off and on the vehicle 120. The offline AP 50 may receive pieces of the content package from different mobile APs 40 and may also function as a source of the received pieces for the mobile APs 40 requiring the received pieces of the content.

In embodiments including a plurality of offline APs 50, the metadata in the content package may specify which offline APs 50 are to receive the content package and which are not. Stated differently, in such embodiments, the mobile AP 40 sends the content package to the offline APs 50 with reference to the metadata in the content package. In these and other similar embodiments, the metadata in the content package may be transferred first (or the relevant portion of the metadata in the content package, such as a torrent file, may be transferred first) so that such determinations may be made. In some embodiments, each of the stationary AP 30, the mobile AP 40, and the offline AP 50 includes a caching server (not shown) to facilitate the transfer of the content package a piece at a time.

After receiving the entire content package, the offline AP 50 presents the content package on the display device 132 mounted on the stationary commuter structure 130 with reference to the metadata in the content package. The offline AP 50 may be connected to the display device 132 through a wired connection or through a wireless connectivity technology, such as Bluetooth®.

In some embodiments, the content package transferred to the mobile AP 40 from the stationary AP 30 is different from the content package transferred to the offline AP 50 from the mobile AP 40. In other words, in such embodiments, the mobile AP 40 may receive more than one content package from the stationary AP 30, one or more of which may be for the mobile AP 40 itself and one or more of which may be destined for the offline AP 50 (or for a plurality of the offline APs 50). Moreover, in some embodiments involving a plurality of vehicles 120, the content package transferred to the mobile APs 40 may be different for each mobile AP 40, or different between or among groups of any number of mobile APs 40. Likewise, in embodiments involving a plurality of stationary commuter structures 130, the content package transferred to the offline APs 50 thereof may be different for each offline AP 50, or different between or among groups of any number of offline APs 50.

In some embodiments, each of the stationary AP 30, the mobile AP 40, and the offline AP 50 obtains demographic information of the environment. In the case of the stationary AP 30, the demographic information may include the number of vehicles 120 visiting the stationary vehicle structure 110 during a given time period, such as during a 24-hour period. In the case of the mobile AP 40, the demographic information may include the number of passengers riding the vehicle 120 during a given time period (e.g., during one day or between 7 a.m. and 9 a.m.), the number of passengers getting on and off at each stop, etc. In some embodiments, significantly more detailed demographic information of the passengers may be obtained. For example, using facial recognition techniques, the sex ratio and even ethnic makeup of the passengers may be obtained. When the vehicle 120 is a bus, the mobile AP 40 may be linked to the fare collection system of the vehicle 120 and thereby obtain additional demographic information, such as the age distribution of the passengers (since it is common for different fares to be paid by students, senior citizens, adults, and children). The offline AP 50 may obtain similar demographic information of persons waiting at the stationary commuter structure 130 and even of pedestrians passing by the stationary commuter structure 130.

The demographic information obtained by the stationary AP 30 is sent to the content distribution portal 20 via the Internet 100. The content distribution portal 20 may then send the demographic information to the content provider 10. The demographic information obtained by the mobile AP 40 is transferred using a P2P protocol when the mobile AP 40 establishes a wireless connection with the stationary AP 30. The demographic information may be sent each time the mobile AP 40 establishes a wireless connection with the stationary AP 30. After obtaining the demographic information from the mobile AP 40, the stationary AP 30 transfers the demographic information to the content distribution portal 20 via the Internet 100. The content distribution portal 20 may then send the demographic information to the content provider 10.

The demographic information obtained by the offline AP 50 is transferred to the mobile AP 40 using a P2P protocol when the offline AP 50 establishes a wireless connection with the mobile AP 40, and this demographic information is sent to the stationary AP 30 from the mobile AP 40 using a P2P protocol when a wireless connection is established therebetween. The demographic information obtained by the offline AP 50 is then transferred to the content distribution portal 20 by the stationary AP 30 via the Internet 100. The content distribution portal 20 may then send the demographic information to the content provider 10.

Moreover, each time the mobile AP 40 establishes a wireless connection with the offline AP 50, the content package is sent from the mobile AP 40 to the offline AP 50, and demographic information is sent from the offline AP 50 to the mobile AP 40. Hence, data may be exchanged each time the mobile AP 40 establishes a wireless connection with the offline AP 50. Similarly, data may be exchanged each time the mobile AP 40 establishes a wireless connection with the stationary AP 30.

In some embodiments, the stationary AP 30 is connected to various systems in the stationary vehicle structure 110, the mobile AP 40 is connected to various systems in the vehicle 120 (in addition to the fare collection system thereof as discussed above), and the offline AP 50 is connected to various systems in the stationary commuter structure 130. In such embodiments, the stationary AP 30, the mobile AP 40, and the offline AP 50 obtain information of various states of the stationary vehicle structure 110, the vehicle 120, and the stationary commuter structure 130, respectively. For example, the mobile AP 40 may obtain information of various mechanical states of the vehicle 120, information related to distances and routes travelled by the vehicle 120, information related to the fares earned by the vehicle 120, etc. In each case, the information may be relayed back ultimately to the content provider 10 in the manner described above.

In the above, examples were given in which the vehicle 120 is a bus and the stationary vehicle structure 110 is a bus service station. However, these examples are given merely for illustrative purposes and the vehicle 120 may be, for example, a taxi or a courier vehicle, and the stationary vehicle structure 110 may be, for example, a taxi station, the house of the taxi driver, or a courier distribution center.

Figure 2:
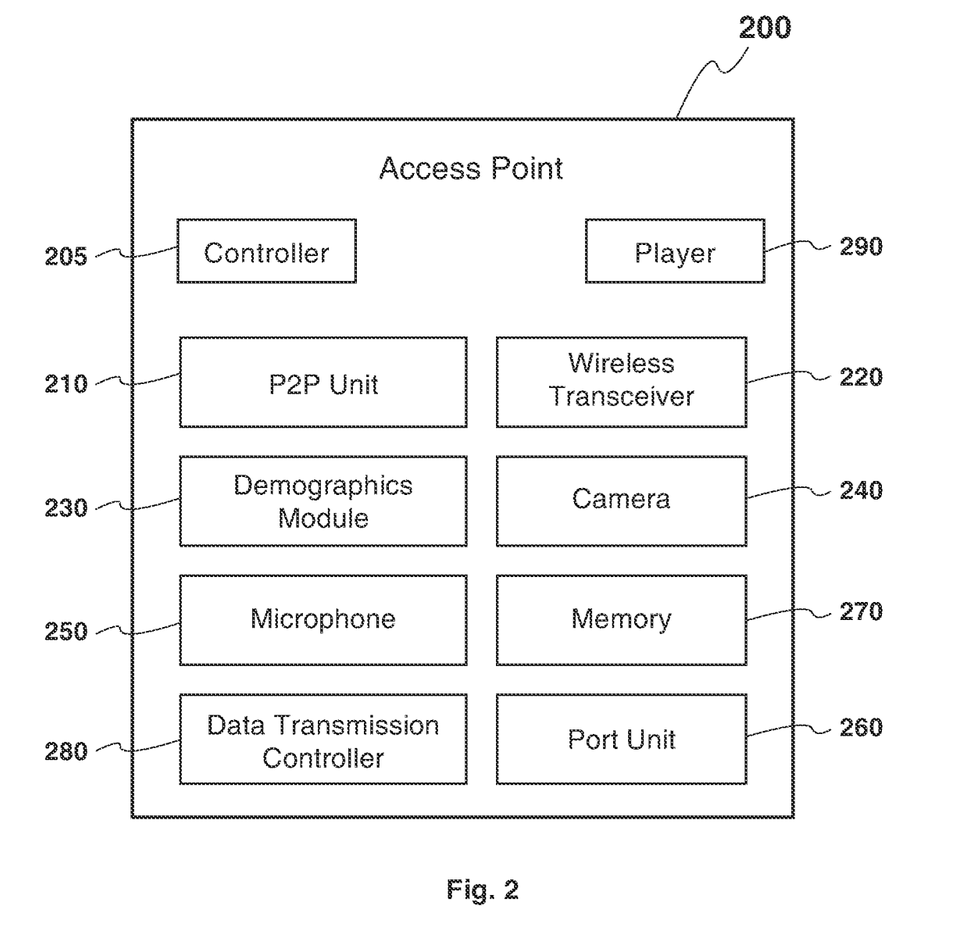
FIG. 2 is a block diagram of one embodiment illustrating an access point in a relayed content distribution and data collection system according to the disclosure herein.

Referring to FIG. 2, a block diagram will be described that illustrates an access point in a relayed content distribution and data collection system according to an embodiment of the present invention. The access point (AP) 200 may be any one of the stationary AP 30, the mobile AP 40, or the offline AP 50 shown in FIG. 1. The AP 200 comprises an access point controller 205, a P2P unit 210, a wireless transceiver 220, a demographics module 230, a camera 240, a microphone 250, a port unit 260, a memory 270, a data transmission controller 280, and a player 290.

The controller 205 may be a processor, microprocessor, microcomputer, or other computing device that executes stored program instructions for controlling the various other units in the access point. The controller 205 may be constructed from any number of transistors or other circuit elements, which may individually or collectively assume any number of states. More specifically, the controller 205 may operate as a state machine or finite-state machine. Such a machine may be transformed to a second machine, or a specific machine, by loading executable instructions contained within the program modules. These computer-executable instructions may transform the controller 205 by specifying how the controller transitions between states, thereby transforming the transistors or other circuit elements constituting the controller from a first machine to a second machine, wherein the second machine may be specifically configured to perform the operations disclosed herein. The states of either machine may also be transformed by receiving input from one or more inputs. Either machine may also transform states, or various physical characteristics of various output devices such as printers, speakers, video displays, or otherwise.

The P2P unit 210 facilitates the transfer of data using a P2P protocol. The wireless transceiver 220 allows for wireless connections with other devices using a wireless connectivity technology, such as WiFi® or Bluetooth®. The demographics module 230 in one embodiment is a program module that when executed by the controller cooperates with the camera 240 and the microphone 250 to obtain demographic information. The port unit 260 includes a plurality of ports for connection to an external power supply, connection to a display device, connection to the Internet via a wired connection, and connection to various other devices as needed.

The memory 270 stores information obtained by the P2P unit 210, the demographics module 230, and through the port unit 260. The memory 270 can also be used to store programs for use by the controller 205, such as instructions contained in the demographics module 230 which when executed cause the controller to perform the operations disclosed herein, including the process flows of FIGS. 3-6 herein. The memory 270 may also be used to store processing results. This may include storing data representing the camera 240 or the microphone 250. The memory 270 is connected to the controller 205 through a bus (not shown). The memory 270 and its associated computer-readable media provide non-volatile storage for the controller 205. Although the description of computer-readable media contained herein refers to a mass storage device, such as a hard disk or CD-ROM drive, it should be appreciated by those skilled in the art that computer-readable media can be any available media that can be accessed by the system 200.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the system 200.

The data transmission controller 280 provides control to do one or more of the following, depending on whether the access point 200 is the stationary AP 30, the mobile AP 40, or the offline AP 50 of FIG. 1: send the content package to other devices through the wireless transceiver 220 in a manner specified by the metadata in the content package, receive the content package through either the wireless transceiver 220 or the port unit 260, and send and receive demographic information to and from other devices through the wireless transceiver 220. The player 290 provides control to present the content segments in the content package on a display device associated with the AP 200 in a manner specified by the metadata in the content package.

Details of the operation of each of these elements may vary slightly, depending on whether the AP 200 is used as the stationary AP 30, the mobile AP 40, or the offline AP 50 of FIG. 1. Moreover, the details of operation of each of these elements when the AP 200 is used as the stationary AP 30, the mobile AP 40, and the offline AP 50 may be determined from the explanation given above and from the description of the flow diagrams provided below.

Methods of relayed content distribution and data collection are now described with reference to the flow diagrams of FIGS. 3-6. It is assumed that prior to the start of the methods, a content package has been created by the content provider 10 and sent to the content distribution portal 20, and further that the content distribution portal 20 has sent the content package to the stationary AP 30. Moreover, to simplify the explanation of the methods, the following additional assumptions are made: a single content package has been created; there is one stationary AP 30, one mobile AP 40, and one offline AP 50; each of the stationary AP, the mobile AP 40, and the offline AP 50 receives the same content package; the mobile AP 40 and the offline AP 50 obtain data (e.g., demographic information) but the stationary AP 30 does not; and the mobile AP 40 and the offline AP 50 each obtains a single packet of data (e.g., a single packet of demographic information).

Figure 3:
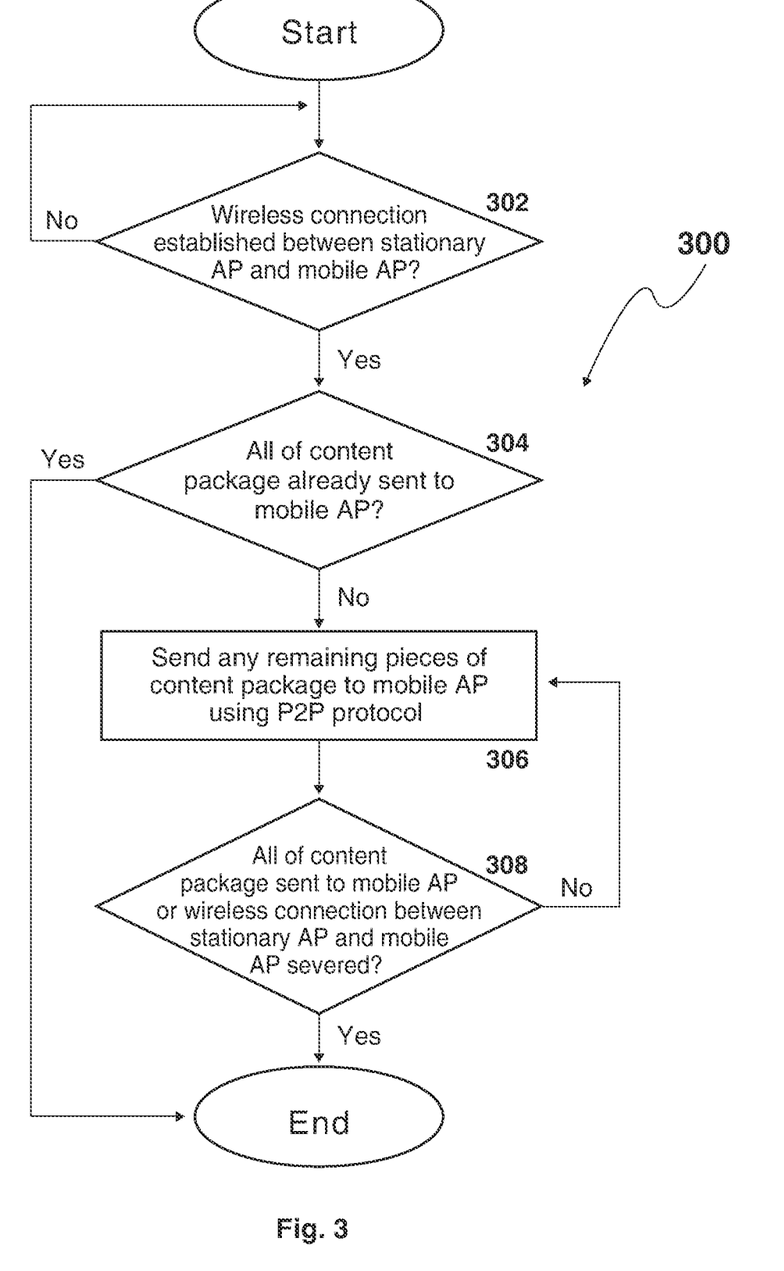
FIG. 3 illustrates one embodiment of a flow diagram illustrating a method of relayed content distribution from a stationary AP to a mobile AP according to the disclosure herein.

Referring to FIG. 3, a flow diagram will be described that illustrates a method of relayed content distribution from a stationary AP to a mobile AP according to an embodiment of the present invention. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed, and in any order, than those shown and described herein.

The routine 300 begins at operation 302, where a determination is made as to whether a wireless connection has been established between the stationary AP 30 and the mobile AP 40. If a wireless connection has not been established between the stationary AP 30 and the mobile AP 40, the routine 300 returns back to operation 302 for another determination. If a wireless connection has been established between the stationary AP 30 and the mobile AP 40, the routine 300 proceeds to operation 304.

At operation 304, a determination is made as to whether the entire content package has already been sent to the mobile AP 40. If the entire content package has already been sent to the mobile AP 40, the routine 300 ends. If the entire content package has not already been sent to the mobile AP 40, the routine 300 proceeds to operation 306.

At operation 306, any remaining pieces of the content package are sent to the mobile AP 40 using a P2P protocol. From operation 306, the routine 300 continues to operation 308, where a determination is made as to whether the entire content package has been sent to the mobile AP 40 or the wireless connection between the stationary AP 30 and the mobile AP 40 has been severed. If either the entire content package has been sent to the mobile AP 40 or the wireless connection between the stationary AP 30 and the mobile AP 40 has been severed, the routine 300 ends. If neither the entire content package has been sent to the mobile AP 40 nor the wireless connection between the stationary AP 30 and the mobile AP 40 has been severed, the routine 300 branches back to operation 306.

When the mobile AP 40 receives the entire content package, the mobile AP 40 provides control to display the content package on the display device 122 of the vehicle 120 with reference to the metadata in the content package.

Figure 4:
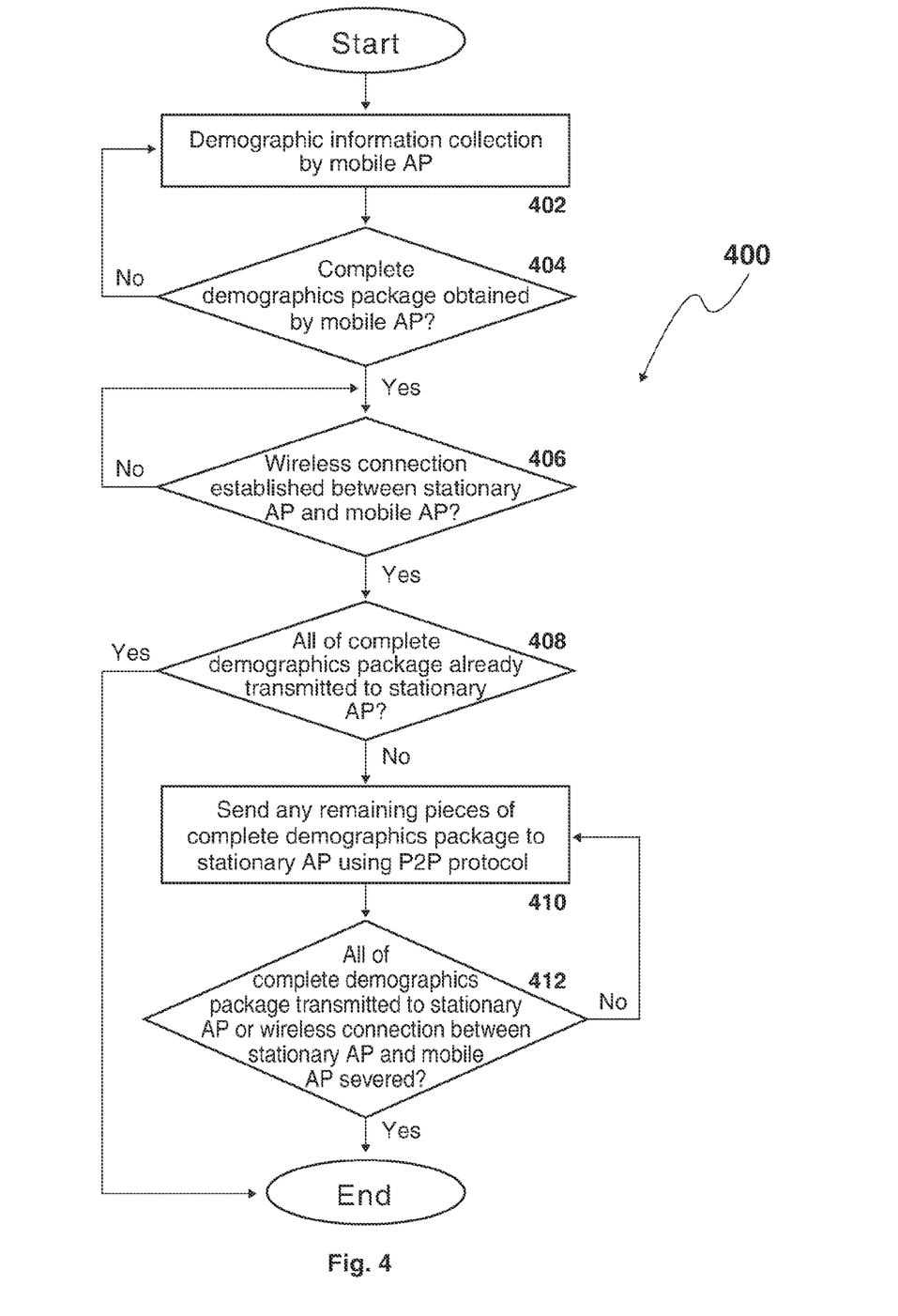
FIG. 4 is a flow diagram illustrating one embodiment of a method of data collection by a mobile AP and relayed content distribution from the mobile AP to a stationary AP according to the disclosure herein.

Referring to FIG. 4, a flow diagram will be described that illustrates a method of data collection by a mobile AP and relayed content distribution from the mobile AP to a stationary AP according to an embodiment. It is noted that this method may be performed simultaneously with the method described with reference to FIG. 3. That is, each time a wireless connection is established between the mobile AP 40 and the stationary AP 30, in addition to the content package being transmitted to the mobile AP 40 from the stationary AP 30, the mobile AP 40 may also transmit data to the stationary AP 30 in the manner described below. In other words, data may be exchanged each time a wireless connection is established between the mobile AP 40 and the stationary AP 30.

The routine 400 begins at operation 402, where data collection is performed by the mobile AP 40. As described above, the mobile AP 40 may be connected to various systems in the vehicle 120 and obtain information therefrom. However, to simplify the explanation to follow, it will be assumed that data collection refers to the collection of demographic information.

From operation 402, the routine 400 continues to operation 404, where a determination is made as to whether a complete demographics package has been obtained by the mobile AP 40. For example, the vehicle 120 may be a bus and the mobile AP 40 may obtain demographic information related to the number of passengers between 7 a.m. and 9 a.m. The mobile AP 40 will have obtained a complete demographics package in this case exactly at or immediately after 9 a.m. Moreover, the demographics package in this case (and also when obtained by either the stationary AP 30 and the offline AP 50) includes information of what the demographic information is related to, from which mobile AP 40 (or which stationary AP 30 or offline AP 50) the demographic information has been obtained in embodiments including a plurality of mobile APs 40 (a plurality of stationary APs 30 or offline APs 50), etc. If a complete demographics package has not been obtained by the mobile AP 40, the routine 400 branches back to operation 402. If a complete demographics package has been obtained by the mobile AP 40, the routine 400 continues to operation 406.

At operation 406, a determination is made as to whether a wireless connection has been established between the stationary AP 30 and the mobile AP 40. If a wireless connection has not been established between the stationary AP 30 and the mobile AP 40, the routine 400 returns back to operation 406 for another determination. If a wireless connection has been established between the stationary AP 30 and the mobile AP 40, the routine 400 proceeds to operation 408.

At operation 408, a determination is made as to whether the complete demographics package has already been transmitted to the stationary AP 30. If the complete demographics package has already been transmitted to the stationary AP 30, the routine 400 ends. If the complete demographics package has not already been transmitted to the stationary AP 30, the routine 400 proceeds to operation 410.

At operation 410, any remaining pieces of the complete demographics package are sent to the stationary AP 30 using a P2P protocol. From operation 410, the routine 400 continues to operation 412, where a determination is made as to whether the complete demographics package has been transmitted to the stationary AP 30 or the wireless connection between the stationary AP 30 and the mobile AP 40 has been severed. If either the complete demographics package has been transmitted to the stationary AP 30 or the wireless connection between the stationary AP 30 and the mobile AP 40 has been severed, the routine 400 ends. If neither the complete demographics package has been transmitted to the stationary AP 30 nor the wireless connection between the stationary AP 30 and the mobile AP 40 has been severed, the routine 400 branches back to operation 410.

The stationary AP 30 may subsequently send the complete demographics package to the content distribution portal 20 via the Internet 100, after which the content distribution portal 20 may send the complete demographics package to the content provider 10 via the Internet 100.

Figure 5:
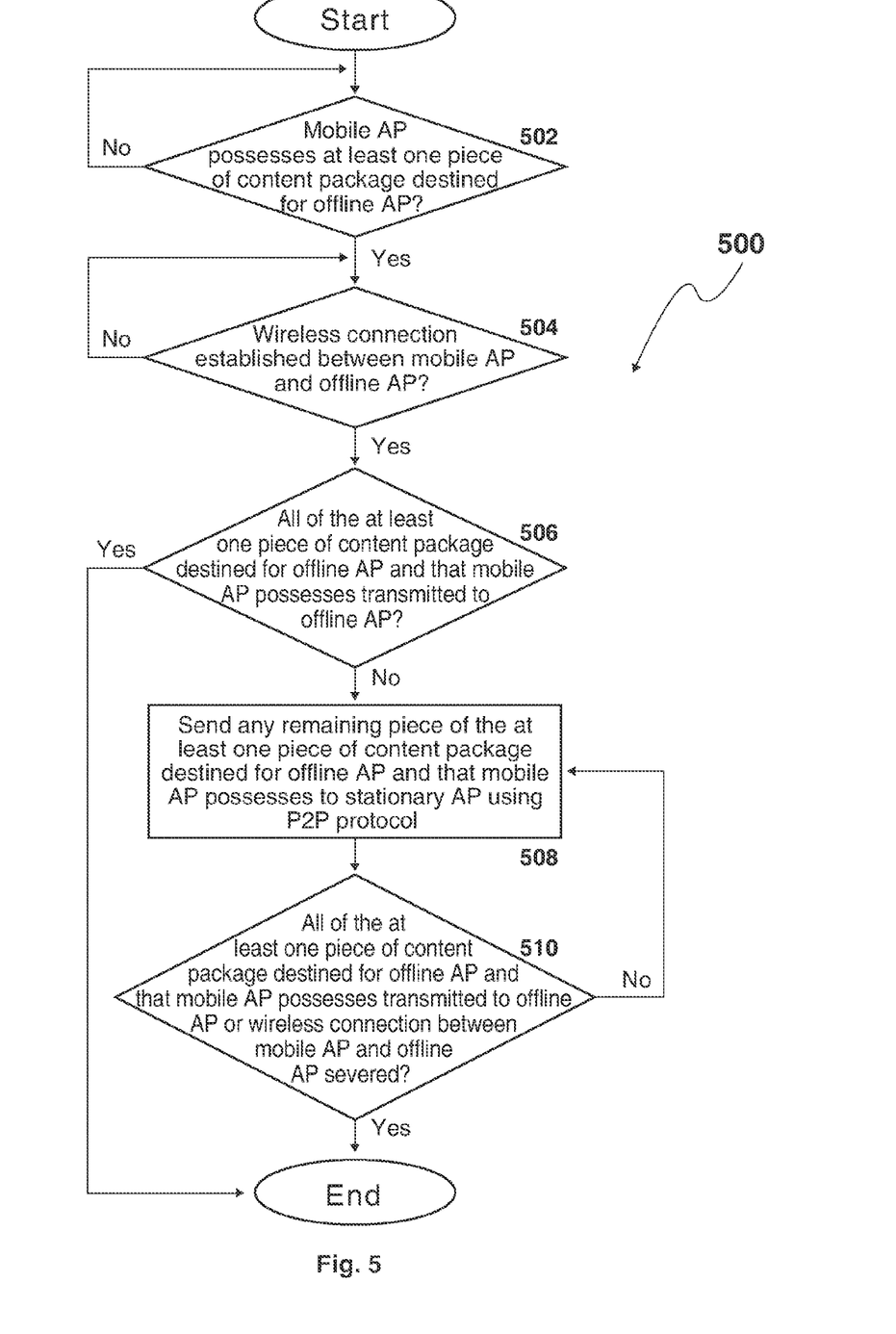
FIG. 5 is a flow diagram illustrating one embodiment of a method of relayed content distribution from a mobile AP to an offline AP according to the disclosure herein.

Referring to FIG. 5, a flow diagram will be described that illustrates a method of relayed content distribution from a mobile AP to an offline AP according to an embodiment of the present invention. The routine 500 begins at operation 502, where a determination is made as to whether the mobile AP 40 possesses at least one piece of a content package destined for the offline AP 50. As described above, with the use of a P2P protocol for file transfer purposes, as each peer receives a new piece of the file it becomes a source of that piece to other peers. Therefore, the mobile AP 40 only needs to possess one piece of a content package destined for the offline AP 50 before proceeding with distribution of the at least one piece of the content package to the offline AP 50. If the mobile AP 40 does not possess at least one piece of a content package destined for the offline AP 50, the routine 500 returns back to operation 502 for another determination. If the mobile AP 40 possesses at least one piece of a content package destined for the offline AP 50, the routine 500 continues to operation 504.

At operation 504, a determination is made as to whether a wireless connection has been established between the mobile AP 40 and the offline AP 50. If a wireless connection has not been established between the mobile AP 40 and the offline AP 50, the routine 500 returns back to operation 504 for another determination. If a wireless connection has been established between the mobile AP 40 and the offline AP 50, the routine 500 proceeds to operation 506.

At operation 506, a determination is made as to whether all of the at least one piece of the content package destined for the offline AP 50 that the mobile AP 40 possesses has been transmitted to the offline AP 50. If all of the at least one piece of the content package destined for the offline AP 50 that the mobile AP 40 possesses has been transmitted to the offline AP 50, the routine 500 ends. If all of the at least one piece of the content package destined for the offline AP 50 that the mobile AP 40 possesses has not been transmitted to the offline AP 50, the routine 500 proceeds to operation 508.

At operation 508, any remaining piece of the at least one piece of the content package destined for the offline AP 50 that the mobile AP 40 possesses is sent the stationary AP 30 using a P2P protocol. From operation 508, the routine 500 continues to operation 510, where a determination is made as to whether all of the at least one piece of the content package destined for the offline AP 50 that the mobile AP 40 possesses has been transmitted to the offline AP 50 or the wireless connection between the mobile AP 40 and the offline AP 50 has been severed. If either all of the at least one piece of the content package destined for the offline AP 50 that the mobile AP 40 possesses has been transmitted to the offline AP 50 or the wireless connection between the mobile AP 40 and the offline AP 50 has been severed, the routine 500 ends. If neither all of the at least one piece of the content package destined for the offline AP 50 that the mobile AP 40 possesses has been transmitted to the offline AP 50 nor the wireless connection between the mobile AP 40 and the offline AP 50 has been severed, the routine 500 branches back to operation 508.

When the offline AP 50 receives the entire content package destined therefor, the offline AP 50 performs control to display the content package on the display device 132 of the stationary commuter structure 130 with reference to the metadata in the content package.

Figure 6:
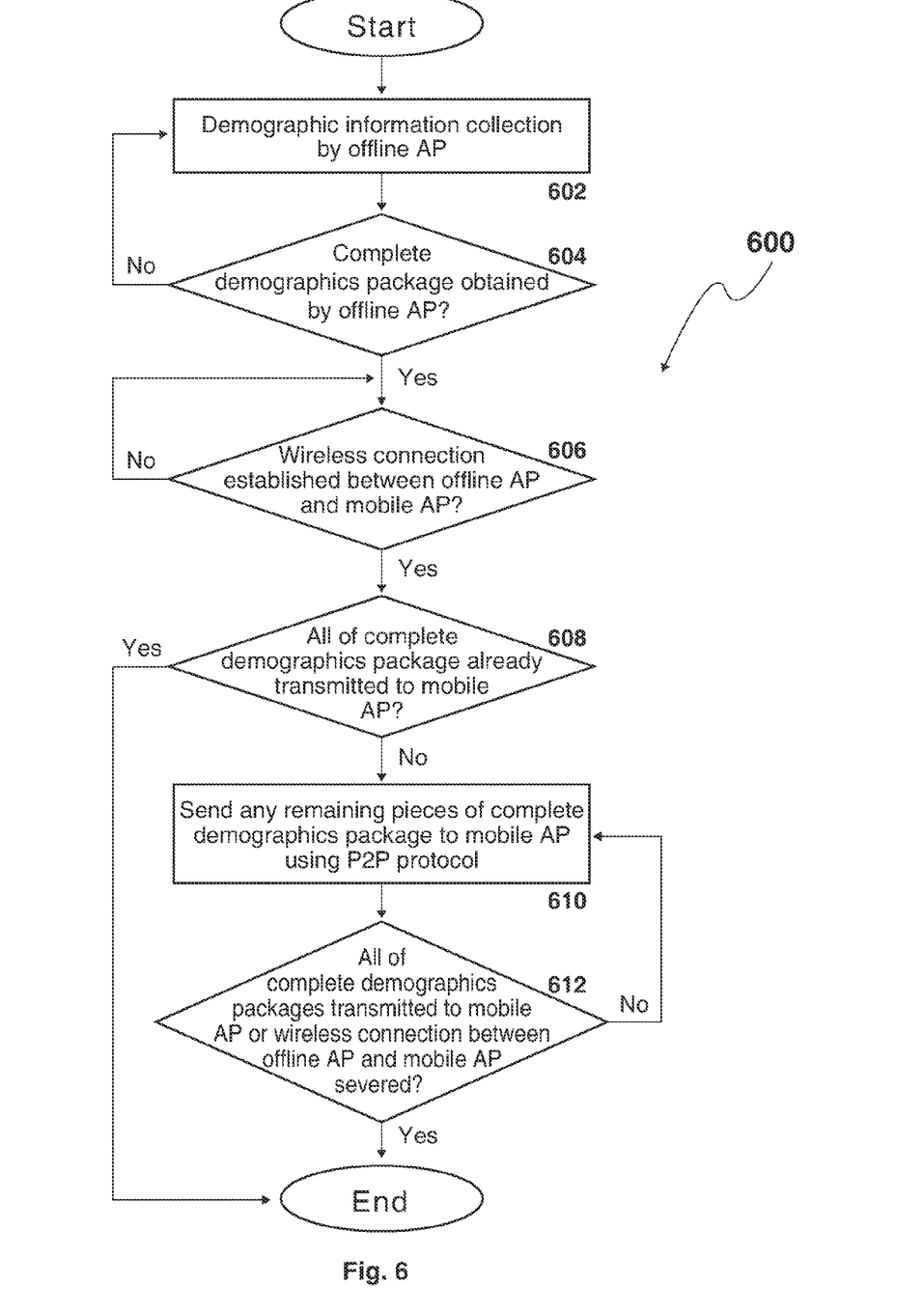
FIG. 6 is a flow diagram illustrating one embodiment of a method of data collection by an offline AP and relayed content distribution from the offline AP to a mobile AP according to the disclosure herein.

Referring to FIG. 6, a flow diagram will be described that illustrates a method of data collection by an offline AP and relayed content distribution from the offline AP to a mobile AP according to an embodiment of the present invention. It is noted that portions of this method may be performed simultaneously with portions of the method described with reference to FIG. 5. That is, each time a wireless connection is established between the offline AP 50 and the mobile AP 40, in addition to the content package transmitted to the offline AP 50 from the mobile AP 40, the offline AP 50 may also transmit data to the mobile AP 40 in the manner described below. In other words, data may be exchanged each time a wireless connection is established between the offline AP 50 and the mobile AP 40.

The routine 600 begins at operation 602, where data collection is performed by the offline AP 50. As described above, the offline AP 50 may be connected to various systems in the stationary commuter structure 130 and obtain information therefrom. However, to simplify the explanation to follow, it will be assumed that data collection refers to the collection of demographic information.

From operation 602, the routine 600 continues to operation 604, where a determination is made as to whether a complete demographics package has been obtained by the offline AP 50. For example, the stationary commuter structure 130 may be a bus stop and the offline AP 50 may obtain demographic information related to the number of commuters waiting at the stationary commuter structure 130 and the number of pedestrians passing by the stationary commuter structure 130 between 7 a.m. and 9 a.m. The offline AP 50 will have obtained a complete demographics package in this case exactly at or immediately after 9 a.m. If a complete demographics package has not been obtained by the offline AP 50, the routine 600 branches back to operation 602. If a complete demographics package has been obtained by the offline AP 50, then routine 600 continues to operation 606.

At operation 606, a determination is made as to whether a wireless connection has been established between the offline AP 50 and the mobile AP 40. If a wireless connection has not been established between the offline AP 50 and the mobile AP 40, then routine 600 returns back to operation 606 for another determination. If a wireless connection has been established between the offline AP 50 and the mobile AP 40, then routine 600 proceeds to operation 608.

At operation 608, a determination is made as to whether the complete demographics package has already been transmitted to the mobile AP 40. If the complete demographics package has already been transmitted to the mobile AP 40, then routine 600 ends. If the complete demographics package has not already been transmitted to the mobile AP 40, then routine 600 proceeds to operation 610.

At operation 610, any remaining pieces of the complete demographics package are sent to the mobile AP 40 using a P2P protocol. From operation 610, the routine 600 continues to operation 612, where a determination is made as to whether the complete demographics package has been transmitted to the mobile AP 40 or the wireless connection between the offline AP 50 and the mobile AP 40 has been severed. If either the complete demographics package has been transmitted to the mobile AP 40 or the wireless connection between the offline AP 50 and the mobile AP 40 has been severed, then routine 600 ends. If neither the complete demographics package has been transmitted to the mobile AP 40 nor the wireless connection between the offline AP 50 and the mobile AP 40 has been severed, then routine 600 branches back to operation 610.

The mobile AP 40 may subsequently send the demographics package to the stationary AP 30 in the manner described above with reference to FIG. 4, and the stationary AP 30 may subsequently send the complete demographics package to the content distribution portal 20 via the Internet 100, after which the content distribution portal 20 may send the complete demographics package to the content provider 10 via the Internet 100.

Although the subject matter presented herein has been described in conjunction with one or more particular embodiments and embodiments, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A relayed content distribution and data collection system, comprising:
a stationary access point ("AP") mounted on, in, or near a stationary vehicle structure and connected to an Internet;
a content distribution portal connected to the Internet and configured to receive a content package including metadata within the content package and content segments from a content provider via the Internet and to send the content package to the stationary AP via the Internet; and
a plurality of mobile APs mounted respectively on or in a plurality of vehicles and associated respectively with display devices mounted on the vehicles, wherein the stationary AP is configured to selectively send the content package including the metadata to one or more of the mobile APs as specified by the metadata that is in the content package and using a peer-to-peer ("P2P") protocol when a wireless connection is established between the stationary AP and any one of the one or more of the mobile APs, and
wherein each of the one or more of the mobile APs to which the content package is sent is configured to receive the content segments in the content package and display the content segments in the content package on the corresponding display device without a triggering event or a manual input in a manner specified by the metadata that is in the content package that is received upon receiving the entire content package from the stationary AP, wherein when the wireless connection is established between a first mobile AP and a second mobile AP, any piece of the content package possessed by the first mobile AP but determined not to be possessed by the second mobile AP is sent to the second mobile AP using the P2P protocol, and any piece of the content package possessed by the second mobile AP but determined not to be possessed by the first mobile AP is sent to the first mobile AP using the P2P protocol.

2. The relayed content distribution and data collection system of claim 1, wherein the mobile AP is configured to obtain demographic information of persons riding in the vehicle and to send the demographic information to the stationary AP using the P2P protocol when the wireless connection is established between the stationary AP and the mobile AP, the stationary AP is configured to send the demographic information obtained by the mobile AP to the content distribution portal via the Internet, and the content distribution portal is configured to send the demographic information obtained by the mobile AP to the content provider via the Internet.

3. The relayed content distribution and data collection system of claim 1, wherein the first mobile AP is further configured so that any piece of the content package possessed by the first mobile AP but not the second mobile AP is sent to the second mobile AP using the P2P protocol upon a determination made with reference to the metadata that the content package is to be sent to the second mobile AP, and the second mobile AP is further configured so that any piece of the content package possessed by the second mobile AP but not the first mobile AP is sent to the first mobile AP using the P2P protocol upon a determination made with reference to the metadata that the content package is to be sent to the first mobile AP.

4. The relayed content distribution and data collection system of claim 1, further comprising:

an offline AP mounted on, in, or near a stationary commuter structure and configured to establish a wireless connection with the mobile AP using a wireless connectivity technology, wherein the mobile AP is configured to send the content package to the offline AP using the P2P protocol when a wireless connection is established between the offline AP and the mobile AP, and the offline AP is configured to present the content segments on a display device mounted on the stationary commuter structure in a manner specified by the metadata upon receiving the entire content package from the mobile AP.

5. The relayed content distribution and data collection system of claim 4, wherein the offline AP is configured to obtain demographic information of persons at or in the vicinity of the stationary commuter structure and to send the demographic information to the mobile AP using the P2P protocol when the wireless connection is established between the offline AP and the mobile AP, the mobile AP is configured to send the demographic information obtained by the offline AP to the stationary AP using the P2P protocol when the wireless connection is established between the stationary AP and the mobile AP, the stationary AP is configured to send the demographic information obtained by the offline AP to the content distribution portal via the Internet, and the content distribution portal is configured to send the demographic information obtained by the offline AP to the content provider via the Internet.

6. A relayed content distribution and data collection method, comprising:

receiving a content package at an Internet content distribution portal from a content provider via the Internet, the content package including metadata and content segments;

sending via the Internet the content package that includes the metadata from the content distribution portal to a stationary access point ("AP") mounted on, in, or near a stationary vehicle structure;

selectively sending the content package that includes the metadata to one or more mobile APs mounted respectively on or in a plurality of vehicles and associated respectively with display devices mounted on the vehicles, from the stationary AP as specified by the metadata and using a P2P protocol when a wireless connection is established between the stationary AP and any one of the one or more mobile APs, wherein any piece of the content package possessed by the first mobile AP but determined not to be possessed by the second mobile AP is sent to the second mobile AP using the P2P protocol that utilizes the wireless connection, and any piece of the content package possessed by the second mobile AP but determined not to be possessed by the first mobile AP is sent to the first mobile AP using the P2P protocol that utilizes the wireless connection; and presenting the content segments in the content package by each of the one or more mobile APs to which the content package is sent on the corresponding display device without a triggering event or a manual input and in a manner specified by the metadata upon receipt of the entire content package from the stationary AP by the each of the one or more mobile APs.

7. The relayed content distribution and data collection method of claim 6, further comprising:

obtaining demographic information by the mobile AP of persons riding in the vehicle;

sending the demographic information obtained by the mobile AP from the mobile AP to the stationary AP using the P2P protocol when the wireless connection is established between the stationary AP and the mobile AP;

sending the demographic information obtained by the mobile AP from the stationary AP to the content distribution portal via the Internet; and sending the demographic information obtained by the mobile AP from the content distribution portal to the content provider via the Internet.

8. The relayed content distribution and data collection method of claim 6, wherein when the first mobile AP and the second mobile AP are mounted on or in a vehicle and associated with a display device mounted on the vehicle.

9. The relayed content distribution and data collection method of claim 6, wherein any piece of the content package possessed by the first mobile AP but not the second mobile AP is sent to the second mobile AP using the P2P protocol upon a determination made with reference to the metadata that the content package is to be sent to the second mobile AP, and any piece of the content package possessed by the second mobile AP but not the first mobile AP is sent to the first mobile AP using the P2P protocol upon a determination made with reference to the metadata that the content package is to be sent to the first mobile AP.

10. The relayed content distribution and data collection method of claim 6, further comprising:

sending the content package from the mobile AP to an offline AP, which is mounted on, in, or near a stationary commuter structure, using the P2P protocol when a wireless connection is established between the offline AP and the mobile AP; and presenting the content segments on a display device mounted on the stationary commuter structure in a manner specified by the metadata upon receipt of the entire content package from the mobile AP by the offline AP.

11. The relayed content distribution and data collection method of claim 10, further comprising:

obtaining demographic information by the offline AP of persons at or in the vicinity of the stationary commuter structure;

sending the demographic information obtained by the offline AP from the offline AP to the mobile AP using the P2P protocol when the wireless connection is established between the offline AP and the mobile AP;

sending the demographic information obtained by the offline AP from the mobile AP to the stationary AP using the P2P protocol when the wireless connection is established between the stationary AP and the mobile AP;

sending the demographic information obtained by the offline AP from the stationary AP to the content distribution portal via the Internet; and sending the demographic information obtained by the offline AP from the content distribution portal to the content provider via the Internet.

12. An access point associated with a vehicle or structure and used in a relayed content distribution and data collection system, comprising:

a port unit configured for wired communication with another device;

a wireless transceiver configured to establish a wireless connection with another device using a wireless connectivity technology;

a P2P unit configured to enable the sending and receiving of data using a peer-to-peer ("P2P") protocol;

a data transmission controller configured to send an advertising content package including metadata to another access point as specified by metadata in a received content package using the P2P protocol and through the wireless transceiver, wherein any piece of the content package possessed by the access point but determined not to be possessed by the another access point is sent to the another access point using the P2P protocol, and any piece of the content package possessed by the another access point but determined not to be possessed by the access point is sent to the access point using the P2P protocol; and a player configured to display content segments in the advertising content package on a display device of the vehicle or structure without a triggering event or a manual event in a manner specified by the metadata in the content package and upon receipt of the entire content package.

13. The access point of claim 12, further comprising:

a camera configured to capture images; and a controller configured to execute instruction in a demographics module causing the controller to analyze the images captured by the camera and obtain demographic information of persons associated with the vehicle or structure;

wherein the data transmission controller is configured to send the demographic information to another access point using the P2P protocol and through the wireless transceiver or to a device connected to the Internet via the port unit.

14. The access point of claim 13, wherein the demographic information comprises the number of persons associated with the vehicle or structure during a predetermined duration of time.

15. The access point of claim 12, further comprising a memory configured to store data received through the port unit and the wireless transceiver.

16. The access point of claim 12, wherein the player is configured to selectively present the content segments in the content package on the display device of the vehicle or structure during specific times of the day, as specified by the metadata in the content package.

17. The relayed content distribution and data collection system of claim 1, wherein the content distribution portal establishes a web user interface and the content provider sends the content package using the web user interface.

18. The access point of claim 12, wherein the data transmission controller is further configured to perform at least one of receiving the advertising content package through the wireless transceiver using the P2P protocol, or receiving the advertising content package through the port unit and the Internet.

* * * * *